US 6,691,199 B1

(12) United States Patent
Yang

(10) Patent No.: US 6,691,199 B1
(45) Date of Patent: Feb. 10, 2004

(54) REMOTE-CONTROL CONNECTION CONTROL DEVICE CONTROLLED BY STORED DIGITAL SIGNALS

(75) Inventor: Shoudu Yang, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 325 days.

(21) Appl. No.: 09/699,343

(22) Filed: Oct. 31, 2000

(30) Foreign Application Priority Data

Mar. 30, 2000 (JP) ........................................ 2000-094801

(51) Int. Cl.[7] ............................. G06F 9/00; G06F 13/00
(52) U.S. Cl. ........................ 710/305; 713/323; 341/126
(58) Field of Search .............................. 710/305, 100; 340/825.69, 825.72, 825.22; 455/151.1; 341/176, 126; 725/93; 359/142; 713/323

(56) References Cited

U.S. PATENT DOCUMENTS

| | | | |
|---|---|---|---|
| 4,110,560 A | * | 8/1978 | Leary et al. |
| 4,439,997 A | * | 4/1984 | Cantley |
| 5,047,700 A | * | 9/1991 | Szakaly |
| 5,457,478 A | * | 10/1995 | Frank |
| 5,777,571 A | * | 7/1998 | Chuang |
| 6,265,987 B1 | * | 7/2001 | Wang et al. |

FOREIGN PATENT DOCUMENTS

JP        A-8-65625        3/1996

OTHER PUBLICATIONS

Welcome to SMBus [online] URL:http://www.smbus.org/index.html, Mar. 21, 2000.
SMBus Specifications [online] URL:http://www.smbus.org/specs/index.html, Jan. 4, 2000.
Smart Battery System Specifications, "System Management Bus Specification Revision 1.1" SBS Implementers Forum, Dec. 11, 1998.

* cited by examiner

Primary Examiner—Gopal C. Ray
(74) Attorney, Agent, or Firm—Staas & Halsey LLP

(57) ABSTRACT

An SMBus protocol is terminated at a personal computer and a remote-control connection control device for converting signals to data that can be received by each device inside a wired remote control is provided. The remote-control connection control device comprises an A/D converter and a register. After being stored in the register, data transmitted from a CPU as SDATA are outputted from SOUT as serial data and exercises direct control over both an LCD driver and a backlight. An analog signal inputted from the switch of the wired remote control is inputted to the remote-control connection control device as an AIN and after being converted into a digital value, the signal is read into the CPU as SDATA via an SMBus and the command is executed.

10 Claims, 3 Drawing Sheets

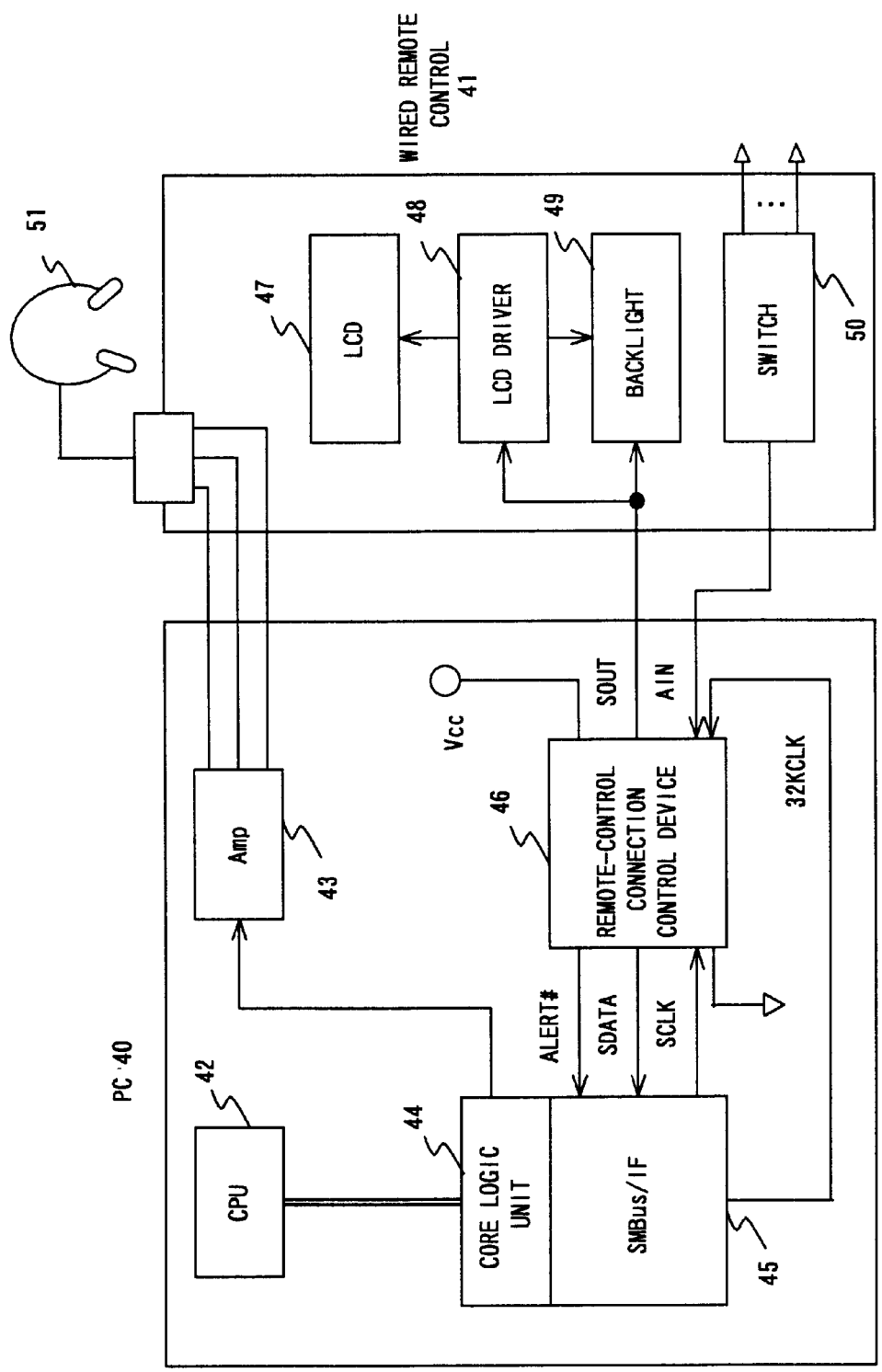
F I G. 2

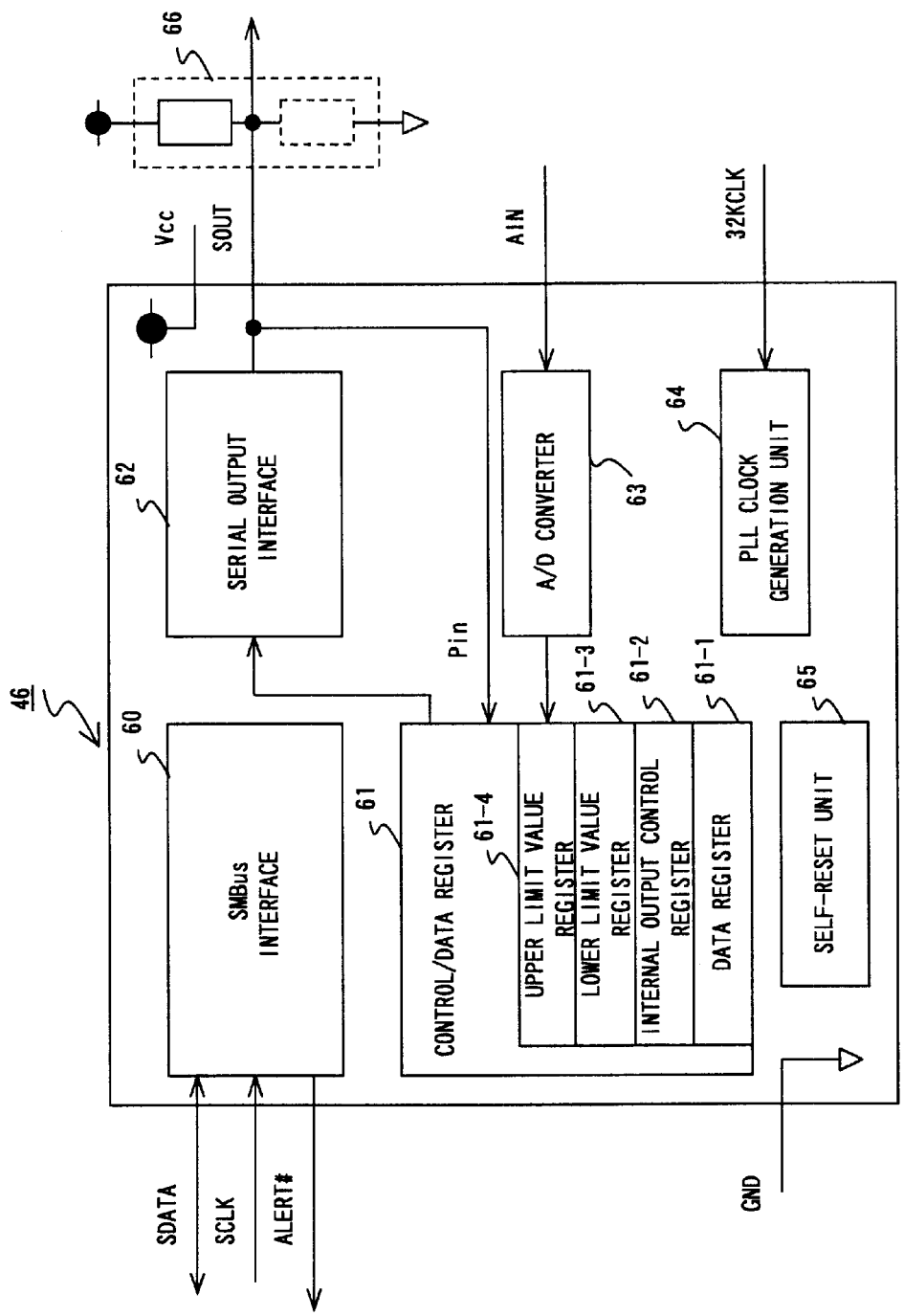
F I G. 3

REMOTE-CONTROL CONNECTION CONTROL DEVICE CONTROLLED BY STORED DIGITAL SIGNALS

BACKGROUND OF THE INVENTION

1. Field of the Invention

The present invention relates to a remote-control connection control device in computers.

2. Description of the Related Art

Recently, each of many portable electric home appliances, such as a portable MD player, etc., has been provided with a wired remote control priced at 500–1,000 yen and the main body of the portable electric home appliance on a consumer market has been operated by such a wired remote control. In this way, the main body put in the pocket of a coat, for example, can be operated by a wired remote control instead of buttons on the main body. Such a wired remote control is very useful when such a portable electric home appliance is carried outside and used while walking.

Recently, the icon display, character display and button function of such an inexpensive wired remote control have tended to be applied to a mobile personal computer. A single-wire serial communications system is used in most of the control ICs of the display unit of the remote control. However, the single-wire serial communications system cannot be directly controlled by a device provided in an existing computer, which is a problem.

As the most inexpensive solution, there is a method of generating a signal suitable for the serial communications protocol via a GPIO (General Purpose I/O) by software and operating a personal computer by a wired remote control. However, in this case, the CPU is occupied for a long time and the performance of an information device is greatly degraded.

There are at present few means for connecting the information device and a general-purpose remote control.

As another means of such a kind, there is a remote control used via a USB in a player, model LF1100 manufactured by Toshiba.

If the USB is used, equipment must be provided with a very complex protocol. Therefore, data packets must be processed on the remote control side according to a protocol for data transmitted/received via a USB, and data must be extracted and interpreted. Actually, an exclusive ASIC or icon is required.

Therefore, if connection is made using high-speed communications means, such as a USB, etc., there are the following problems.
(1) Cost is high.
(2) Since cables must be sealed in the case of high-speed communications, a remote control becomes heavy.
(3) Since a microcomputer used in the remote control supports USB and high-speed operations are required, power consumption becomes large.

SUMMARY OF THE INVENTION

It is an object of the present invention to provide with a simple configuration a device for connecting a remote control to a personal computer.

The control device of the present invention connects an information device operated by digital signals and a remote controller for generating analog signals as command signals. The control device comprises conversion means for converting analog signals into digital signals and storage means for storing the converted digital signals. The processing unit of the information device executes instructions from the remote controller by reading the digital signals stored in the storage means.

According to the present invention, instructions can be issued to an information device operated by digital signals based on a prescribed protocol without making a special modification to a remote controller for generating analog signals as command signals. Therefore, an inexpensive remote controller with a simple configuration can be easily connected to the information device and can be easily used.

BRIEF DESCRIPTIONS OF THE DRAWINGS

FIG. 2 shows the connection between a personal computer and a wired remote control in the preferred embodiment of the present invention.

FIG. 3 shows the configuration of the remote-control connection control device shown in FIG. 2.

DESCRIPTION OF THE PREFERRED EMBODIMENT

Figure 1:
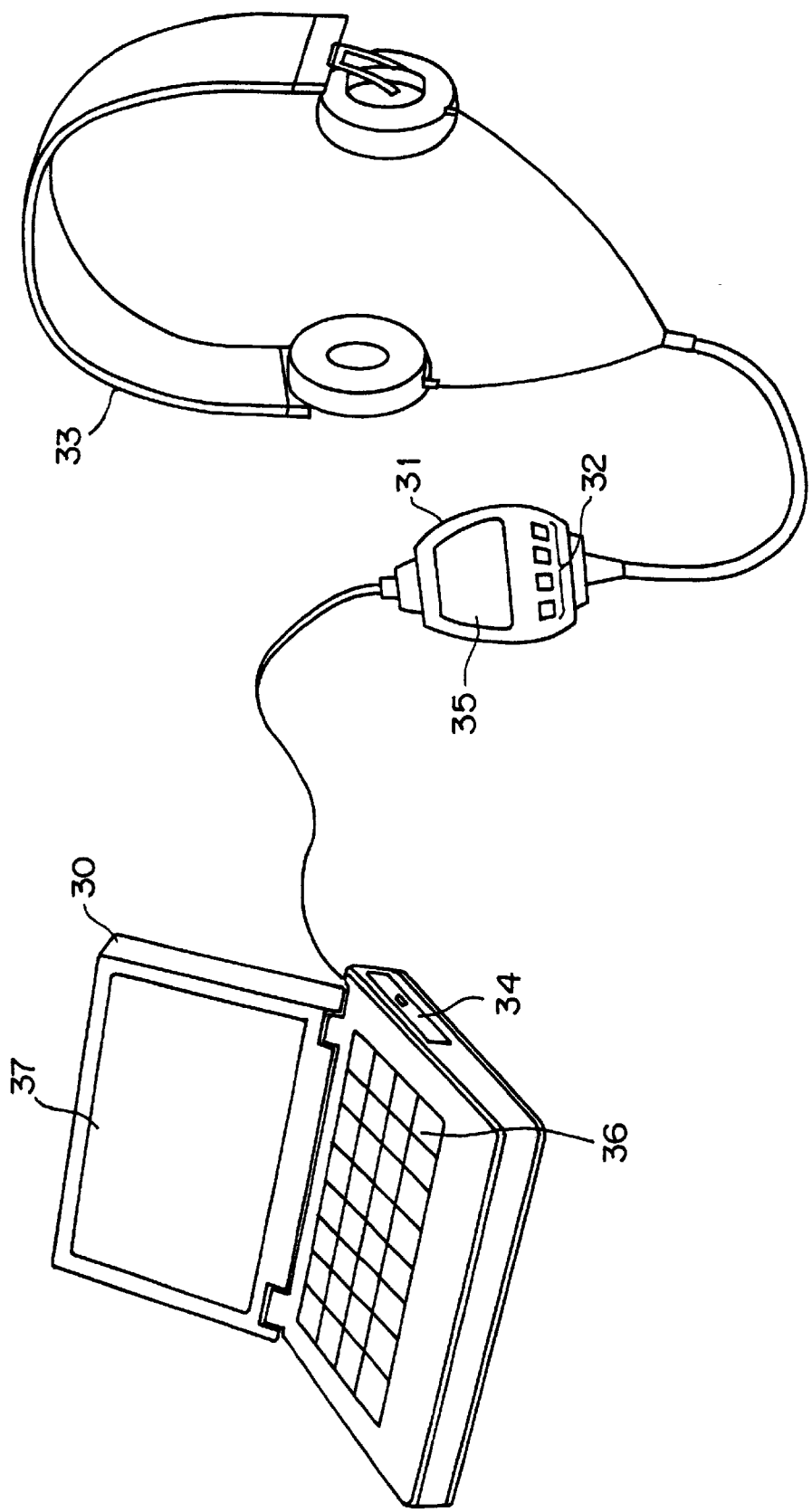
FIG. 1 shows how a wired remote control and a laptop personal computer are connected and used.

The remote-control connection control device in the preferred embodiment of the present invention is an interface used between the control signal of a headphone remote control set used in electric home appliances on the market (analog input/single-wire serial output) and an internal control signal usually provided in a personal computer (SMBus). The device is also conversion means in which both the character/icon display and each button input of the remote control set can be easily controlled.

First, how the preferred embodiment of the present invention is used is briefly described below.

FIG. 1 shows how a wired remote control and a portable information-processing device, such as a laptop personal computer are connected and used.

In FIG. 1, a wired remote control 31 is connected to a laptop personal computer 30 and a headphone 33 is further connected to the wired remote control. A user sets a music CD in the CD-ROM drive 34 of the laptop personal computer 30, executes a music CD play program provided as application software in the laptop personal computer 30 and listens to music using the headphone 33. In this case, usually the user not only plays the music CD tracks sequentially from the first number, but also plays the same number repeatedly. Alternatively, the user programs and plays only his/her favorite numbers.

Such operations are performed by operating the switch 32 of the wired remote control 31. The title, play time, etc., of a number being currently played are displayed on an LCD 35. If the laptop personal computer 30 is provided with such a wired remote control 31, the user can play a music CD tracks easily as he/she likes simply by pressing the switch 32 of the wired remote control 31 instead of operating the music CD play program on the display 37 of the laptop personal computer 30 using the keyboard 36 or mouse, which is not shown in FIG. 1, of the laptop personal computer 30 while viewing the display 37.

Generally, if the wired remote control 31 is not provided when a music CD is played using the laptop personal computer 30, the laptop personal computer must be operated in the same way as it is when an ordinary software program is executed. However, when listening to music, nontroublesome operation is preferable and a simple operation is desired. In other words, a simple operation using the wired remote control 31 can meet such user requirements.

The hardware in the preferred embodiment of the present invention is described in detail below.

FIG. 2 shows the connection between a personal computer and a wired remote control in the preferred embodiment of the present invention.

In FIG. 2, a CPU 42 is built into a personal computer 40 and the CPU 42 executes a program for playing a music CD track. The CPU 42 reads the music data of the music CD set in a CD-ROM driver, which is not shown in FIG. 2, and the data are outputted from a core logic unit 44. The music data transmitted from the core logic unit 44 are amplified by an amplifier 43, are transmitted to a wired remote control 41 via a wire, are further transmitted to a headphone 51 without modifications and are supplied to a user as music.

In this preferred embodiment of the present invention, an SMBus I/F 45, which is adopted in most laptop personal computers, is used and the following equipment is incorporated in a one-chip IC with 8 pins (remote-control connection control device 46) in such a way that an inexpensive remote control (wired remote control 41) of a single-wire serial communications system can be used.

(1) An SMBus communications I/F.
(2) An SMBus-accessible register.
(3) A single-wire serial output unit for converting 16-bit data written in an output register into single-wire serial communications protocol signals and outputting the signals.
(4) An A/D converter for converting analog input signals into digital output signals and writing the signals in the register.
(5) A PLL for generating clocks required by both the single-wire serial output unit described in (3) above and the A/D converter described in (4) above from external 32 kHz input clocks.
(6) A self-reset circuit that automatically sets the internal register by resetting the internal equipment at the time of power-on and by detecting an SOUT pull-up/pull-down resistor.

By providing such a remote-control connection control device 46, analog signals that are generated by pressing a switch 50 inputted from the wired remote control 41 to the personal computer 40, are inputted to the remote-control connection control device 46 of the personal computer 40 with out conversion. Simultaneously, signals based on a protocol that can control both an LCD driver 48 and a backlight 49 directly are outputted from the remote-control connection control device 46. Therefore, the title, play time, etc., of a track being currently played can be displayed on an LCD 47 of the wired remote control on the market without any modifications to the remote control. Simultaneously, a user's desired replay method, etc., that is set by pressing the switch 50, can be implemented by the personal computer 40.

ALERT#, SDATA, SLICK, 32 KCLK, SOUT and AIN shown in FIG. 2 are described below. VCC is a power-supply voltage.

FIG. 3 shows the configuration of the remote-control connection control device shown in FIG. 2.

The remote-control connection control device shown in FIG. 3 preferably has an IC data structure of an 8-pin, one-chip.

In FIG. 3, first, an SMBus interface 60 is provided to transmit/receive data to/from the CPU of a personal computer. SDATA outputted/inputted to/from the SMBus interface 60 are data for indicating control contents, and include user's instruction data from a wired remote control, which are read when the CPU exercises control over a CD-ROM, display data for the LCD of the wired remote control, etc. The data format is based on SMBus specifications.

The SMBus specifications can be downloaded from the Internet. For details, please see a data file pointed by the following URL.

Smart Battery System Specifications, "System Management Bus Specification, Revision 1.1", [online], issued by SBS Implementers Forum (Dec. 11, 1998) Internet<URL: http://www.smbus.org/specs/smbus110.pdf>

An SCLK is a clock signal for synchronizing equipment when a data packet is transmitted/received based on SMBus specifications and is inputted to the SMBus interface 60. An SMBus usually consists of two lines: a line for transmitting data packets and a line for transmitting clock signals. In this way, the number of the used lines of an SMBus is only two. Since compared with a USB, the protocol is simple and the power consumption is small, the load on the CPU of the computer is small. Therefore, both the high power consumption efficiency and high operation efficiency of a CPU can be realized.

An ALERT# outputted from the SMBus interface 60 is inputted to the power supply of the personal computer, which is not shown in FIG. 3, and the offering controller of the CPU, which is not shown in FIG. 3. If the personal computer is in a soft-off or suspended state, an ALERT# is used to turn on the power supply of the personal computer. If the switch of the wired remote control is pressed, the ALERT# is also used to make an offering to the CPU to execute a process corresponding to the pressing of the wired remote control.

A data packet inputted from the personal computer to the SMBus interface 60 is processed according to the protocol and the data content is stored in the data register 61-1 of a control/data register 61. The data from the personal computer that are stored in the data register 61-1 of the control/data register 61 are the content of a data register to be written in an internal output control register 61-2 also provided in the control/data register 61. The data are transmitted to a serial output interface 62 based on the transmitting control data to be transmitted to a serial output interface 62, are converted into signals that can control the LCD of the wired remote control directly and are transmitted to the wired remote control as SOUT. If an SOUT is inputted to the wired remote control, as shown in FIG. 2, a backlight or LCD driver is driven and the title, playtime, etc., of a track are displayed on the LCD.

An analog signal generated by pressing down the switch of the wired remote control is inputted to an A/D converter as an AIN. Then, the voltage value of the analog signal is converted into a digital value and is set in the data register 61-1. It is predetermined, at the time of installation, which operation is instructed in relation to each voltage value. For example, if the voltage value of an analog signal is 0.1v, the play is started or if the value is 0.2v, the play is stopped. The digital data of these voltage values are written in the data register 61-1.

If the SMBus interface 60 judges that data are written in the data register 61-1 of the control/data register 61, the interface inputs an ALERT# signal to the offering controller, which is not shown in FIG. 3, of the CPU and makes the CPU read the content of the data register 61-1 via the SMBus. The CPU analyzes the digitized voltage value that the CPU has read in this way using installed application software supported by the wired remote control, interprets a user's command and executes the command.

A PLL clock generation unit 64 receives a clock signal of 32 kHz (32 KCLK) from an I/F 45 and generates a clock signal for synchronizing the whole operation of the remote-control connection control device 46.

As described later, a pull-up/pull-down resistor 66 is provided to set whether the personal computer in a soft-off or suspended state should be activated in response to the input of an AIN when a specific switch of the wired remote control is pressed. Furthermore, if the personal computer is set to be activated, a self-reset unit 65 is operated and the setting content of a register of the control/data register 61, such as the setting content of the data register 61-1, is reset to the default value.

The operation sequences in the preferred embodiment of the present invention are described below.

(1) A character to be displayed on the remote control or a control code is written in the data register 61-1 of an IC (remote-control connection control device 46) via an SMBus from the application software of the laptop personal computer.

(2) Similarly, a control code is written in the internal output control register of the IC via an SMBus and the data stored in the data register in (1) above are outputted from a serial output interface 62, which performs the single-wire serial conversion of data, to the remote control side. In this way, an icon or character information is displayed on the display unit of the remote control.

(3) The switch input information of the remote control side is inputted to an AIN at an analog voltage level, and the A/D converter 63 in the IC automatically converts the information into a digital voltage value and writes the value in the data register 61-1.

(4) The application software of the laptop personal computer reads the voltage value of the AIN of the IC via an SMBus, recognizes an operated button by the information and plays music or exercises control over the power supply.

(5) If the operation of a specific switch or all switches are detected by the register setting in the IC, an offering is made to the laptop personal computer by an ALERT#. Therefore, only when there is no need for the application software to always poll and there is a switch operation, the pressing of a switch can be detected.

Next, a function to activate a personal computer in a soft-off or suspended state (wake-up function) by the SOUT pull-up/pull-down resistor is described.

A wake-up function is a function that if an input voltage from an AIN becomes a specific value (for example, 2.0–2.5v) by operating a button (switch) on the remote control side, the ALERT# pin of the remote-control connection control device 46 becomes active (for example, low), the main power supply unit of the system is turned on and the system is switched from a suspended state to a normal operation state.

If a pull-up resistor is provided in a SOUT pin, the remote-control connection control device 46 confirms that the level of the SOUT pin is high and enables the wake-up function of the internal control circuit of the personal computer the moment the remote-control connection control device is turned on.

If in a state where the wake-up function is enabled, the voltage of an AIN becomes a specific value (for example, 2.0–2.5v) by operating a specific button of the remote control, the system is waked up from a soft-off or suspended state by an ALERT# signal.

If the wake-up function is not required, it is detected that the level of the SOUT pin is low using a pull-down resistor and the wake-up function of the PC internal control circuit is disenabled. If a specific button of the remote control is operated in a state where the wake-up function is disenabled, there is no change in the output of the ALERT# pin and the system is not waked up from a soft-off or suspended state.

According to the design specifications of the system, it is determined which should be provided in the SOUT pin, a pull-up resistor or pull-down resistor, and it is also determined whether a wake-up function is used immediately after the control device is turned on. However, the enable/disenable setting of a wake-up function can also be modified by writing in the upper/lower limit value register 61-3/61-4 inside the remote-control connection control device 46 after the activation of the system. Specifically, to check whether the input voltage value of an AIN is within a prescribed range, the upper/lower limit values of the AIN input voltage value used to activate the wake-up function are stored in advance in the upper/lower limit value registers 61-4 and 61-3, respectively, and by comparing these values with the AIN, it is determined whether the wake-up function is used. However, the enable/disenable setting of the wake-up function can be modified by rewriting one or both of the upper/lower limit values. The SOUT pull-up/pull-down resistor is used to enable/disenable the wake-up function in a state where the internal registers (upper/lower limit value registers 61-4 and 61-3) of the remote-control connection control device 46 cannot be set.

According to the present invention, a personal computer can be controlled using a remote control without modifying an inexpensive and simple remote control.

What is claimed is:

1. A control device for connecting an information device that is operated by a plurality of digital signals and a remote controller that generates a plurality of analog signals as a plurality of command signals, comprising:

a conversion unit converting analog signals into digital signals;

a storage unit storing the converted digital signals, wherein a processing unit of the information device executes instructions from the remote controller by reading the digital signals stored in the storage unit; and a serial data conversion unit converting a plurality of control data written in said storage unit by the processing unit of the information device into a plurality of serial signals that can drive said remote controller directly.

2. The control device according to claim 1, wherein the writing is performed according to an SMBus protocol.

3. A control device for connecting an information device that is operated by a plurality of digital signals and a remote controller that generates a plurality of analog signals as a plurality of command signals, comprising:

a conversion unit converting analog signals into digital signals;

a storage unit storing the converted digital signals, wherein a processing unit of the information device executes instructions from the remote controller by reading the digital signals stored in the storage unit; and an activation setting unit judging whether the information device should be switched to a normal activation mode according to an instruction from said remote controller if the information device is in a soft-off or suspended state.

4. The control device according to claim 3, wherein said activation setting unit comprises: a storage unit storing a plurality of upper/lower limit values of a voltage value of the analog signal from said remote controller, and said storage unit switches the information device from a soft-off or suspended state to a normal activation state if a voltage value of the analog signal is between the upper/lower limit values.

5. A control device for connecting an information device that is operated by a plurality of digital signals and a remote controller that generates a plurality of analog signals as a plurality of command signals, comprising:

a conversion unit converting analog signals into digital signals; and a storage unit storing the converted digital signals, wherein a processing unit of the information device executes instructions from the remote controller by reading the digital signals stored in the storage unit, and wherein an offering is made to the processing unit of the information device and the command from said remote controller is executed, if an analog command signal is inputted from said remote controller.

6. An information-processing apparatus with an information device operated by a plurality of digital signals, a remote controller for generating a plurality of analog signals as a plurality of command signals and a control device for connecting the information device and remote controller, wherein said control device comprises:

a conversion unit converting analog signals into digital signals;

a storage unit storing the converted digital signals, and wherein a processing unit of the information device executes instructions from the remote controller by reading the digital signals stored in the storage unit; and a serial data conversion unit converting a plurality of control data written in said storage unit by a processing unit of the information device into a plurality of serial signals that can drive said remote controller directly.

7. The information-processing device according to claim 6, wherein the writing is performed according to an SMBus protocol.

8. An information-processing device with an information device operated by a plurality of digital signals, a remote controller for generating a plurality of analog signals as a plurality of command signals and a control device for connecting the information device and remote controller, wherein said control device comprises:

a conversion unit converting analog signals into digital signals;

a storage unit storing the converted digital signals, and wherein a processing unit of the information device executes instructions from the remote controller by reading the digital signals stored in the storage unit; and an activation setting unit judging whether the information device should be switched to a normal activation mode according to an instruction from said remote controller if the information device is in a soft-off or suspended state.

9. The information-processing device according to claim 8, wherein said activation setting unit comprises: a storage unit storing upper/lower limit values of a voltage value of an analog signal from said remote controllers; and said storage unit switches the information device from a soft-off or suspended state to a normal activation state if a voltage value of the analog signal is between the upper/lower limit values.

10. An information-processing device with an information device operated by a plurality of digital signals, a remote controller for generating a plurality of analog signals as a plurality of command signals and a control device for connecting the information device and remote controller, wherein said control device comprises:

a conversion unit converting analog signals into digital signals;

a storage unit storing the converted digital signals, and wherein a processing unit of the information device executes instructions from the remote controller by reading the digital signals stored in the storage unit, and wherein an offering is made to the processing unit of the information device and the command from said remote controller is executed, if an analog command signal is inputted from said remote controller.

* * * * *